WILLIAM D. CUTLER, OF PHILADELPHIA, PENNSYLVANIA.

*Letters Patent No. 81,987, dated September 8, 1868.*

IMPROVED METHOD OF PREPARING, DESICCATING, AND PRESERVING FISH.

The Schedule referred to in these Letters Patent and making part of the same.

*To all whom it may concern:*

Be it known that I, WILLIAM D. CUTLER, of Philadelphia, in the county of Philadelphia, and State of Pennsylvania, have invented a new Method of Preparing, Desiccating, and Preserving Fish, for family use and as an article of commerce; and I do hereby declare the following to be a full and exact description of the same.

I take the fish, either fresh or salted, and remove all the skin and bones. I then put it in a machine adapted for grating or grinding, making this process such as to thoroughly disintegrate the fibre of the fish.

The next process is to desiccate it thoroughly. I do this by spreading the mass upon metal or stone, or other suitable surface, heated by means of steam-pipes passing beneath the slabs.

Here the article remains, subject to gentle heat, until it is well dried and in suitable condition for packing. Usual time of drying-process, under ordinary circumstances, from one-half hour to three or four hours.

I put up the article in close paper or wooden boxes, to prevent absorption of moisture or giving off unpleasant odor; one pound, more or less.

In drying, I do not confine myself to the method above given. Any other suitable method may be adopted.

If thought desirable, fish that are very fatty and oily may be subjected to pressure after being ground, to remove the superabundance of oil, and afterwards dried and packed.

My invention consists in skinning, boning, disintegrating, and desiccating fish, by which it becomes not only convenient for packing, for commercial purposes, but will be preserved sweet and unchanged for a long time, while in the ordinary state it would deteriorate and become unfit for use. Thus, the result of my experiments may be claimed as advantageous to the commercial dealer, and of economy to the consumer.

The absence of offensive odor from fish put up in this way, will go far in commending it to use.

What I claim as my invention, and desire to secure by Letters Patent, is—

1. The boned and desiccated fish, as a new manufacture and commercial article.

2. The herein-described process or method of treatment of fish, substantially as set forth and for the purposes specified.

In testimony whereof, I have signed my name to this specification in the presence of two subscribing witnesses.

WILLIAM D. CUTLER.

Witnesses:
WM. H. FORSTER,
JAS. W. NEWLIN.